July 29, 1969  L. ROMANZI, JR., ET AL  3,457,603
TRIGGER RELEASE SAFETY BELT BUCKLE APPARATUS
Filed Aug. 30, 1967  3 Sheets-Sheet 1
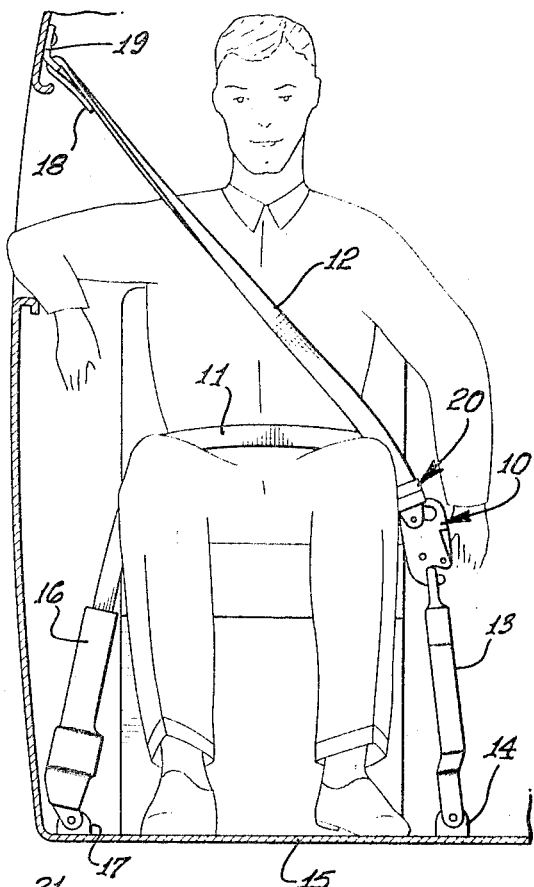
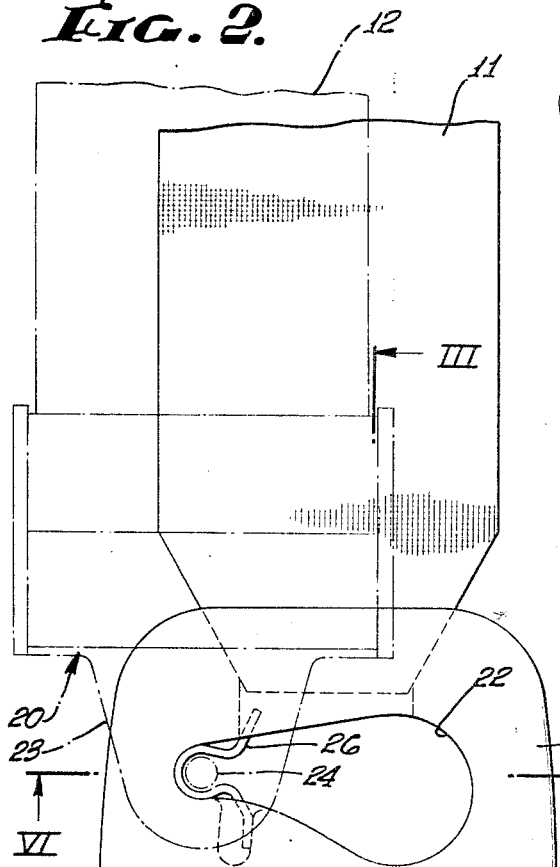
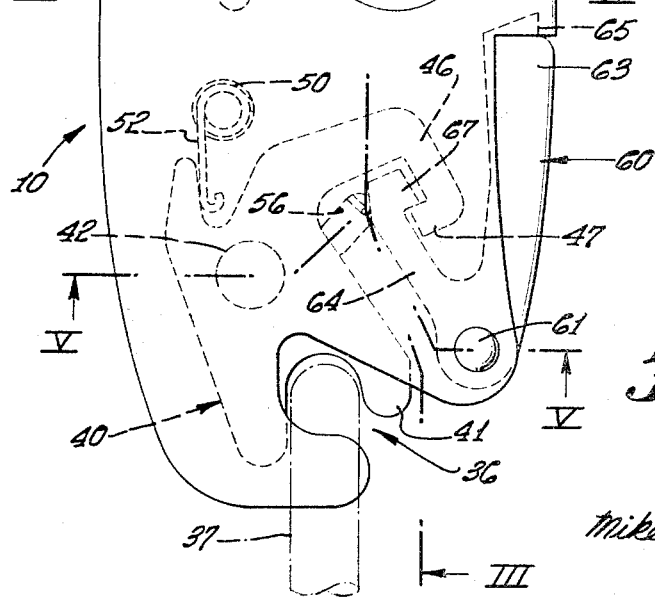
LOUIS ROMANZI, JR.
JEFFREY VAN DORN
INVENTORS.
BY
Miketta, Glenny, Poms & Smith
ATTORNEYS.

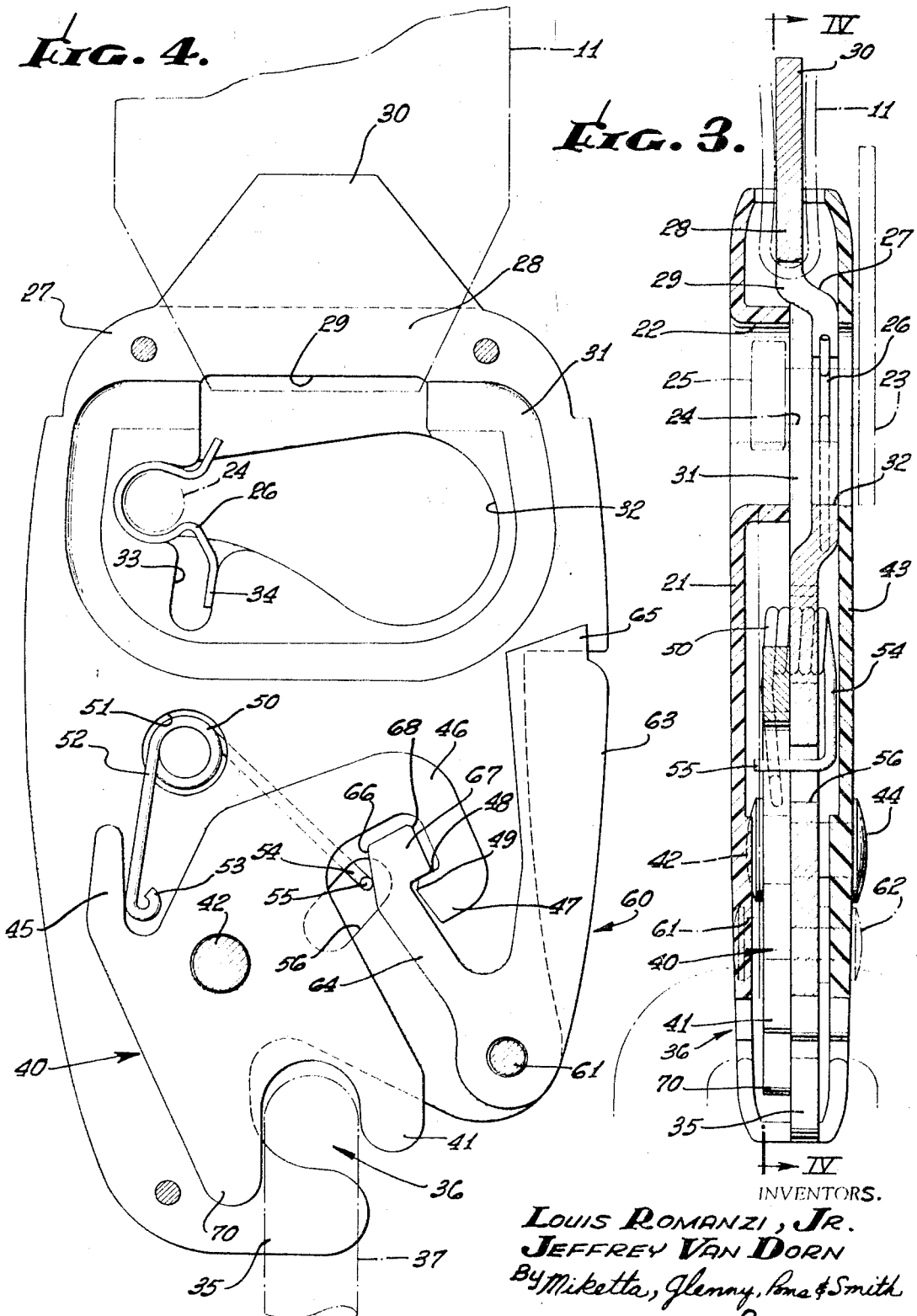

July 29, 1969  L. ROMANZI, JR., ET AL  3,457,603
TRIGGER RELEASE SAFETY BELT BUCKLE APPARATUS
Filed Aug. 30, 1967  3 Sheets-Sheet 3
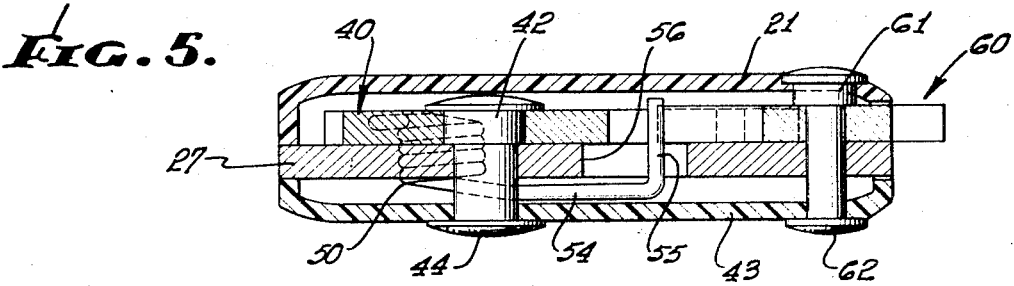
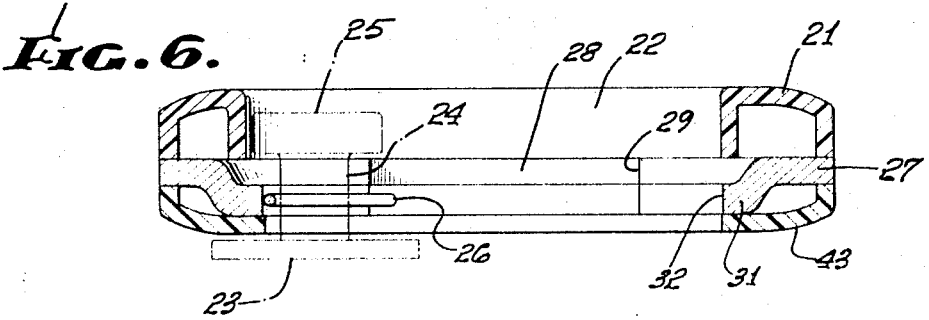
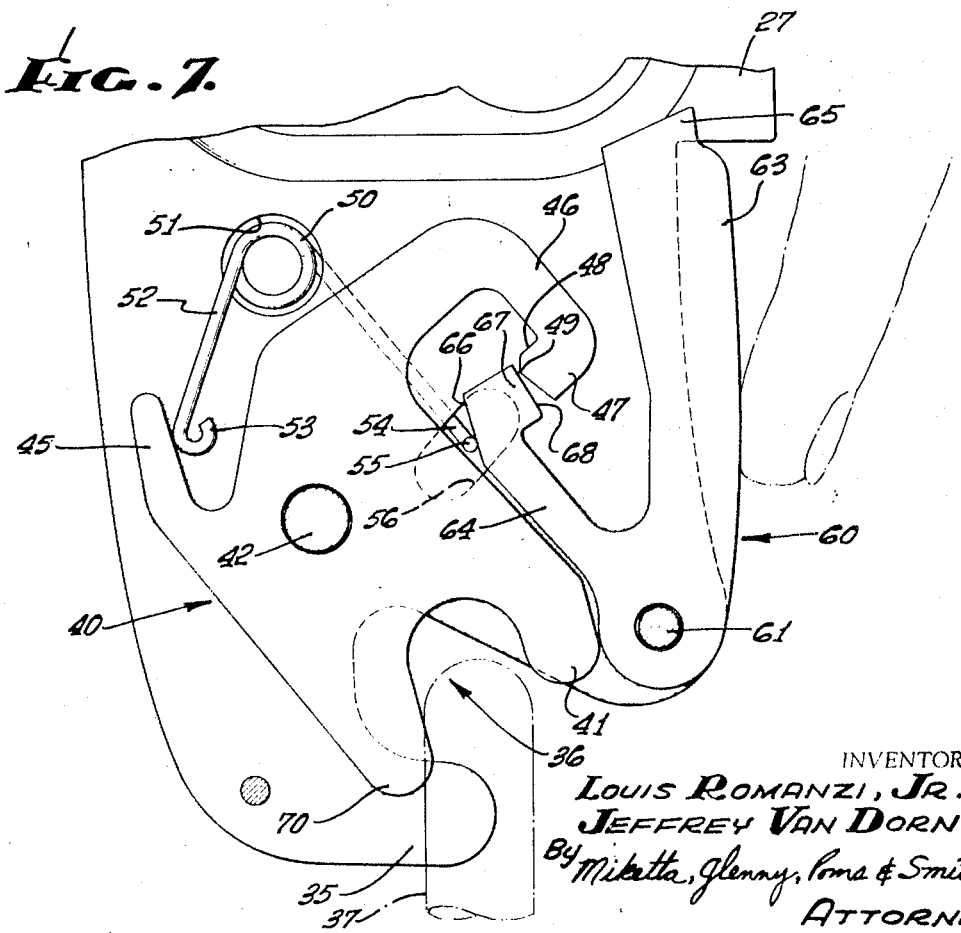
INVENTORS.
LOUIS ROMANZI, JR.
JEFFREY VAN DORN
By Miketta, Glenny, Poms & Smith
ATTORNEYS.

United States Patent Office 3,457,603
Patented July 29, 1969

3,457,603
TRIGGER RELEASE SAFETY BELT BUCKLE
APPARATUS
Louis Romanzi, Jr., Detroit, and Jeffrey van Dorn,
Southfield, Mich., assignors to American Safety
Equipment Corporation, New York, N.Y., a corporation of New York
Filed Aug. 30, 1967, Ser. No. 664,418
Int. Cl. A44b 11/00
U.S. Cl. 24—241         10 Claims

ABSTRACT OF THE DISCLOSURE

A trigger release safety belt buckle apparatus for releasably connecting an end of a safety belt strap or combination lap belt and shoulder belt harness to a floor mounted fitting employed in moving vehicles to safely restrain a passenger in his vehicle seat. A buckle base plate including a hook portion at one end defining a fitting receiving slot, latch means pivoted on said base plate about an axis spaced away from said slot for latching or locking a fitting received in said base plate slot behind said hook portion, a trigger release lever pivoted on said base plate near said plate slot and cooperating with said latch means to hold said latch means in locked or latched position until said trigger lever is depressed inwardly of the buckle apparatus by the user and spring biasing means for biasing said latch means and said trigger means in opposite rotative directions, the latch means being biased toward a release position and the trigger lever being biased toward an outwardly or cocked position, and wherein the trigger lever and latch means have constantly interfering abutment portions maintained in rattle free engagement under the urging of said spring biasing means when in either latched or unlatched positions.

Background of the invention

Safety belt restraint devices, including combination shoulder and lap belt harnesses, have become more widely used in recent years because of federal legislation demanding their use in new automobiles as well as their recognized safety characteristics and advantages when used by the passengers in moving vehicles. Most of the safety belt buckle devices employed in such harness or safety belt combinations have been of a type evolved from those employed previously in aircraft by aviators and wherein a tongue plate on one strap section is releasably received in and locked within a complementary plate receiving buckle body. However, in designing shoulder strap and lap strap combination restraint or harness devices for automotive vehicles, it has been found desirable in some instances to use a floor mounted fitting to which the buckle apparatus may be latched slightly below but generally adjacent to the hip area of the passenger with either one or two safety straps crossing the passenger's body to stationary mountings therefor. Prior buckle devices employed for latching on to a floor mounted fitting have employed a structural or main frame with a hook portion at one end and latch means for holding a complementary floor mounted fitting within the hook portion as shown in our co-pending application Ser. No. 620,721 filed Mar. 6, 1967 entitled "Shoulder Strap-Lap Belt Buckle Connector" and now Patent No. 3,378,301 issued Apr. 16, 1968. The buckle apparatus of said co-pending application Ser. No. 620,721 has a single pivoted and biased latch means which is operated by grasping and moving the cover for the buckle apparatus itself in a direction vertically away from the floor mounted eye-like fitting.

It is an object of the present invention to provide a trigger release safety belt buckle apparatus wherein the buckle apparatus may be released from the floor mounted fitting by squeezing a trigger provided on the apparatus rather than moving the entire case for the buckle apparatus as in the previously mentioned buckle devices. Trigger release buckles have been known heretofore as, by way of example, in the German Patent No. 236,818 (Nov. 10, 1964) wherein a single spring biased lever is pivotally mounted to a base plate, one end of the lever serving as a trigger and the other end of the lever serving as a means for retaining a complementary fitting latched to the buckle base. However, such prior trigger buckles have not been entirely successful because of the difficulty in releasing the buckle apparatus from the complementary floor fitting when the associated safety strap is under load conditions. In addition, such prior trigger buckle devices have not been adapted to maintain the latch means in a fixed open position ready to easily receive the complementary floor fitting and latch thereon and also because they have had objectionably loose moveable and rattling components thereof when in the unlatched position.

It is therefore the primary object of the present invention to disclose and provide a quick acting trigger release safety belt buckle apparatus for use in releasably retaining a safety belt strap to a floor mounted eye-like fitting wherein separate latch means and trigger means are pivotally mounted to a buckle base plate having a hook portion at one end thereof in a manner so that said latch means and trigger means are held in a cocked rattle free relationship in either latched or unlatched positions.

It is another object of the present invention to disclose and provide a quick acting trigger release safety belt buckle apparatus as in the foregoing object wherein the biasing means includes a single spring means with arm portions at its opposite ends abutting and biasing the latch means and trigger means, respectively, into said cocked positions.

It is a still further object of the present invention to disclose and provide a quick acting trigger release safety belt buckle apparatus as in the foregoing objects wherein the trigger means and latch means are provided with cooperating interfering arm portions which abut one another in a rattle free cocked position under the urging of said spring bias when said latch means and trigger means or lever are in either a latched (locked) or an unlatched (released) position.

Summary of the invention

This invention relates in general to safety belt buckles and buckle apparatus for use in safety restraint devices for passengers in moving vehicles and, more particularly, to a trigger release safety belt buckle apparatus for use in releasably locking or latching the ends of a lap strap or lap strap and shoulder strap harness combination to a floor mounted fitting to safely retain an automobile passenger in his vehicle seat.

Generally stated, the invention includes the provision of a buckle base plate having a hook portion at one end thereof defining a fitting receiving slot to receive a complementary floor mounted end fitting having an upper end of eye-like configuration. A safety strap receiving means is provided at the opposite end of such buckle base plate to receive either a single strap end or the ends of a combination lap belt and shoulder belt harness. Latch means are pivotally mounted on the buckle base plate between its ends about an axis spaced rearwardly of said slot and includes a locking finger or extension adapted to protrude into the slot to retain a complementary fitting received in said slot when the latch means is held in a locked or latched position by a cooperating trigger means.

The trigger means provided is pivotally mounted on the base plate to pivot about an axis generally adjacent the hook portion slot with a trigger arm extending generally along the side of the buckle base plate. A second arm, at an acute angle to the trigger arm, is provided for engaging and locking the latch means in its latched position. Inward movement of the trigger arm relative to the buckle apparatus causes the latch means engaging or locking arm to release the latch means to allow it to move to a released position under the bias of spring means provided.

Spring or biasing means are provided to bias the latch means to an unlatched or released position when the trigger means is moved inwardly of the buckle apparatus. In the preferred form of the invention, the spring means also biases the trigger means outwardly of the buckle apparatus.

The latch means is provided with a re-entrantly folded extension arm extending generally toward the trigger means and the trigger means locking arm is provided with a laterally extending abutment portion to catch onto the latch means extension arm and thereby retain the latch means in its locked position when a complementary fitting is positioned in the base plate fitting receiving slot. When the trigger means is moved inwardly of the buckle apparatus, the trigger means locking arm releases the latch means re-entrantly folded extension arm allowing the latch means to pivot to its release position. However, in such release position, the latch means extension arm abuts an end face abutment surface of the trigger means locking arm abutment portion to hold the trigger means and latch means in a cocked unlatched rattle free position ready to be latched onto the complementary floor mounted fitting.

The independently pivoted latch means and trigger means thus provided on the buckle base plate have the advantage of being held in a rattle free locked position when assembled to the complementary floor mounted fitting and held in a cocked release position under the urging of the spring means bias when not assembled to such floor means. The buckle apparatus according to the present invention is therefore easily released even when the associated safety harness or lap belt is under load, is always ready to be reconnected to the floor fitting when in a released position and does not have loose rattling components when in the released position preparatory to being locked onto the complementary floor fitting.

Further objects, advantages and improved resultants of the quick acting trigger release safety belt buckle apparatus, according to the present invention, will become readily apparent to those skilled in the art from the following detailed description of a preferred exemplary embodiment of such buckle apparatus. Throughout such detailed description of the preferred exemplary embodiment of buckle apparatus, according to the present invention, reference will be made to the appended sheets of drawings in which:

FIG. 1 is an elevational view of a conventional two-strap combination shoulder strap and lap strap harness employing the safety buckle apparatus according to the present invention;

FIG. 2 is a plan view of the safety belt buckle apparatus of FIG. 1, according to the present invention, showing the buckle mechanism in latched position;

FIG. 3 is a section view of the safety belt buckle apparatus of FIG. 2 taken therein along the plane III—III;

FIG. 4 is a horizontal sectional view of the safety belt buckle apparatus of FIGS. 2 and 3 taken along the plane IV—IV in FIG. 3;

FIG. 5 is a section view of the safety belt buckle apparatus of FIG. 2 taken therein along the plane V—V;

FIG. 6 is a section view of the safety belt buckle apparatus of FIG. 2 taken therein along the plane VI—VI; and FIG. 7 is a plan view, partially in section, of the safety belt buckle apparatus of FIG. 2 with the cover plate removed and the latch means and trigger means shown is unlatched or released position.

Referring first to FIG. 1, the quick-acting trigger release safety belt buckle apparatus, according to the present invention, is shown in use for releasably retaining a combination shoulder strap and lap belt safety harness to a floor mounted fitting in a vehicle such as an automobile or airplane. The safety belt buckle apparatus, indicated generally at 10, is connected directly to the lap belt 11 and releasably, within the discretion of the user, to the shoulder strap 12, as hereinafter explained. The buckle mechanism is adapted to latch onto a floor mounted fitting or hoop 13, which in the exemplary embodiment, is pivotally mounted upon a floor bracket 14 secured to the vehicle floor or frame 15.

Lap strap 11, in the exemplary embodiment, is connected at its end opposite the buckle apparatus to a retraction mechanism 16 which may be pivotally mounted to a floor bracket 17, also secured to the vehicle floor or frame 15. Retraction mechanism 16 may be made in accordance with United States Letters Patent No. 3,174,704 and is adapted to retract strap 11 on release of the buckle apparatus from fitting 13 and lock or prevent further withdrawal of strap 11 after latching of the buckle apparatus to the floor fitting 13 as shown in FIG. 1.

The shoulder or chest strap 12 may be mounted at its end 18, opposite to the end attached to the buckle apparatus, to a vehicle body mounted fitting 19 positioned above the passenger's shoulder. Chest strap 12 is adapted to pass diagonally across the passenger's chest and is provided with a combination pin connector and adjuster means, indicated generally at 20, for releasably connecting into the buckle apparatus, indicated generally at 10. The pin connector and adjuster means may be constructed in accordance with out co-pending application Ser. No. 620,721, filed Mar. 6, 1967 and entitled "Shoulder Strap-Lap Belt Buckle Connector."

Referring now to FIG. 2, the exemplary safety belt buckle apparatus of the present invention is shown with a top cover 21 including at its rearward end an aperture 22 to receive the pin connector and adjuster means, indicated generally at 20. As seen in phantom line in FIGS. 2 and 3, the combination adjuster and connector, indicated generally at 20, is provided with a base plate 23 upon which a pin 24 with an enlarged head 25 is mounted. As more fully disclosed in our co-pending application, Ser. No. 620,721, referred to hereinabove, the pin 24 is received in and retained by the bias of a spring 26 mounted to the buckle apparatus main frame or base plate 27, as best seen in FIG. 4. The length of shoulder or chest strap 12 may be adjusted at the adaptor, indicated generally at 20, and be, at the discretion of the user, connected or released from the safety belt buckle apparatus by merely inserting or removing it from the connection means provided by spring 26 provided in the buckle apparatus at the restricted end of aperture 22.

Lap strap 11, as seen in FIGS. 2, 3 and 4, is, in the exemplary embodiment, non-adjustably secured to the rear end portion or bar 28 of the buckle base plate 27. A strap receiving recess or aperture 29 is provided in the base plate 27, in the exemplary embodiment, to allow holding of the strap 11 about the strap receiving bar 28. Also, in the exemplary embodiment, the buckle apparatus base plate 27 is provided with an extension or tail portion 30 which extends outwardly beween the top and bottom strap portions of strap 11 which are sewn together rearwardly of the tail portion 30.

Base plate 27 is structurally strengthened by the provision of an embossed portion 31 about the base plate aperture 32. A slot 33 is also provided in the base plate 27 to receive and retain the end or arm 34 of spring 26.

At the forward end of base plate 27, as best seen in FIG. 4, there is provided a hook portion 35 defining a slot, indicated generally at 36, for receiving the end of floor fitting 13. In the exemplary embodiment, floor fitting 13 is provided with an eye-like end 37 which is adapted to be received into slot 36 with the end of hook 35 protruding into the eye aperture. Latch means, as hereinafter explained, are adapted to latch onto and lock the eye-like end 37 of the floor fitting 13 to the buckle apparatus subject to release, at the discretion of the user, by the depression of a trigger release mechanism, as particularly contemplated within the present invention.

Latch means are provided in the safety belt buckle apparatus, according to the present invention, for latching onto and locking the complementary fitting received into the buckle apparatus. In the exemplary embodiment, such latch means are indicated generally at 40 and include a locking finger 41 for retaining the fitting end 37 received in the buckle apparatus slot, indicated generally at 36, behind the hook portion 35. The latch means, indicated generally at 40, is pivotally mounted to the buckle base plate 27 by the cap or enlarged headed rivet means 42, as best seen in FIG. 5. Rivet 42 may be adapted to pass down through base plate 27 and through the bottom cover 43 to retain the bottom cover to the buckle apparatus by means of the bottom rivet cap 44.

Biasing means are provided in the buckle apparatus for constantly biasing the latch means toward an unlocked or release position. Such release position for the latch means, indicated generally at 40, is shown in FIG. 7. In the exemplary embodiment, such biasing means including the spring 50 positioned within aperture 51 provided in the buckle base plate 27. As best seen in FIGS. 4 and 7, a spring arm 52 is adapted to constantly abut and bias the rearwardly extending projection 45 of the latch means. Spring arm 52 may be provided with a curved or folded end 53 to provide a smooth rounded abutment surface for travel along the inner edge of projection 45 during pivoting of the latch means, indicated generally at 40, between the latched or locked position of FIG. 4 and the unlatched or release, cocked position of FIG. 7.

Trigger means are provided in the safety belt buckle apparatus for quickly triggering or releasing the latch means, indicated generally at 40, from its locked position of FIG. 4 to be moved by the bias of spring 50 into the release position of FIG. 7. In the exemplary embodiment, such trigger means are indicated generally at 60 and are pivotally mounted on the base plate 27 to pivot about an axis generally adjacent the slot, indicated generally at 36. As best seen in FIGS. 2 and 4, the trigger means is pivoted about a rivet 61 which provides a pivot axis near the forward end of the buckle base plate and generally adjacent the fitting receiving slot of the buckle apparatus. Rivet 61, as seen in FIG. 5, is provided with a head overlying portions of the top cover of the buckle apparatus case and extends downwardly through the trigger means, base plate 27 and has a bottom rivit head 62 underlying the bottom cover 43.

The trigger means, indicated generally at 60, includes a trigger arm 63 and a latch means engaging and locking arm 64. The arms 63 and 64 extend rearwardly of the buckle base plate 27 from the pivotal axis of the trigger means provided by rivet 61, the arms generally defining an acute angle therebetween. As will be more fully described herein, inward movement of the trigger arm 63, as by the user depressing it, as seen in FIG. 7, allows relative movement of the latch means, inidcated generally at 40, from the position of FIG. 4 to the release position of FIG. 7. An extension 65 on the trigger arm 63 is adapted to limit outward movement of arm 63 by engaging inner sidewall portions of the top cover 21, as seen in FIG. 2.

Biasing means are provided for biasing the trigger means into its latched or cocked position of FIG. 7. As best seen in FIGS. 4 and 5, such biasing means include the provision of a spring arm 54 on spring 50 which underlies base plate 27 and includes a vertical extension 55 which passes upwardly through an aperture 56 in base plate 27 to abut the trigger means locking arm 64 along an inclined abutment surface 66. As seen from a comparison of FIGS. 4 and 7, the extension 55 of spring arm 54 abuts and moves along the inclined surface 66 on trigger means locking arm 64 while biasing arm 64 constantly toward the cocked position of FIG. 4. Spring 50 is retained laterally within the buckle apparatus by being positioned in aperture 51 in the buckle base plate 27 and is constrained vertically within the apparatus due to the provision of arm 54 between plate 27 and bottom cover 43, as seen in FIG. 5. The spring 50 is thus loosely retained within the buckle apparatus free to constantly bias both the latch means into its release position while biasing the trigger means into its locked position. As seen in FIGS. 4 and 7, spring arm 54 is longer than spring arm 52. Consequently, the spring bias of spring 50 and its associated arms 52 and 54 is greater upon the latch means, indicated generally at 40, than it is upon the trigger means, indicated generally at 60. The spring bias thus tends to hold the latch means in its locked position of FIG. 4 while biasing the trigger means arm 64 in a rattle-free tight engagement with the latch means as explained more fully hereinafter.

As particularly contemplated within the present invention, the latch means, indicated generally at 40, and the trigger means, indicated generally at 60, are provided with cooperating interfering or abutment arm portions which are constantly in a cooperating, rattle-free relation whether in the locked position of FIG. 4 or the release position of FIG. 7. The latch means is provided with a re-entrantly folded extension arm 46 including the inwardly directed abutment end portion 47. Extension arm 46 extends generally toward the trigger means and is re-entrantly folded upon itself so that the end abutment portion 47 is directed generally perpendicularly back toward the latch means body and its pivotal axis about the rivet 42. Abutment portion 47 is provided with a catch surface 48 which lies in a plane generally intersecting the axis of the rivet 42 about which the latch means pivots. Abutment portion 47 is provided with an inclined end surface and chamfered adjacent surface 48 to provide a thin or approximately line contact abutment surface at 49 for engaging a complementary abutment portion 67 on the trigger means locking arm 64.

In the latched or locked position of FIG. 4, the laterally extending abutment portion 67 on trigger means locking arm 64 catches or latches onto the latch means re-entrantly folded extension arm end portion surface 48. Spring arm 54 biases the trigger means arm 64 toward its full outward position with the trigger means trigger arm extension 65 lying adjacent and within the cover 21 side wall. The latch means, indicated generally at 40, is prevented from rotating counter-clockwise in FIG. 4 with the trigger means in its cocked position of FIG. 4 because of the interference between the trigger means locking arm extension 64 and the latch means re-entrantly folded arm end abutment portion 47. However, upon manually depressing the trigger means trigger arm 63, as shown in FIG. 7, the integral locking arm 64 swings counter-clockwise in FIG. 4 about its axis provided by rivet 61 into the release position of FIG. 7. Such release or triggering movement of the trigger means, indicated generally at 60, allows the end abutment portion 47 of the re-entrantly folded arm 46 of the latch means to pass upwardly over the end face 68 of the locking means extension 67, the latch means assuming its release position of FIG. 7 under the bias of spring arm 52. Such release movement of the latch means, indicated generally at 40, is limited due to the abutment of locking finger 41 of the latch means against the hub or pivoted end portion of the trigger means, as seen in FIG. 7. In this position of the latch means, the safety belt buckle apparatus may be removed from the eye-like end 37 of the floor mounted fitting 13 and the lap strap 11 may be retracted into the retraction mechanism 16 releasing the passenger from the safety harness.

In the released position of FIG. 7 for the latch means, indicated generally at 40, and upon the release of the trigger means by the user, it can be seen that the trigger means and latch means are held in a rattle-free release position, ready to be relatched upon the floor mounted fitting 13, due to the cooperating interference between the trigger means locking arm 64 and the latch means re-entrantly folded arm 46 under the combined effect of the spring means bias of spring arms 52 and 54. When the user desires to relatch the safety belt buckle apparatus on the end 37 of the floor fitting 13, he need merely direct the hook end 35 into the eye-like end fitting causing the fitting to engage the latch means resetting arm 70. The engagement between the floor fitting and resetting arm 70 causes rotation of the latch means, indicated generally at 40, from the release position of FIG. 7 back to the locked position of FIG. 4. During such resetting rotation of the latch means, the end abutment 49 on the latch means re-entrantly folded arm 46 slides along the surface 68 of the trigger means locking arm abutment end 67 until the portion 67 slides over and catches upon the surface 48 of the latch means cooperating abutment portion 47. The spring arms 52 and 54 constantly bias the latch means and trigger means arms 46 and 64 against each other during such resetting or latching operation to provide a smooth operating, rattle-free latching of the buckle apparatus to the end of the floor fitting.

We claim:

1. A quick acting trigger release safety belt buckle apparatus for use in releasably retaining a safety belt strap to a floor mounted eye fitting, said trigger buckle apparatus comprising:

a buckle base plate having a hook portion at one end thereof defining a fitting receiving slot and safety strap receiving means at an opposite end thereof;

latch means pivotally mounted on said base plate between said ends and including a locking finger for retaining a fitting received in said slot behind said hook portion when said latch means is maintained in a locked position;

trigger means pivotally mounted on said base plate to pivot about an axis generally adjacent said hook portion slot and including a trigger arm and a latch means engaging and locking arm, said arms extending rearwardly of said buckle base plate from said axis and defining an acute angle therebetween, for releasing said latch means from said locked position when said trigger arm is moved inwardly of said buckle apparatus; and biasing means mounted to said base plate for constantly biasing said latch means toward an unlocked position and said trigger means outwardly of said buckle apparatus.

2. A trigger buckle apparatus as in claim 1 wherein:

said latch means is provided with a re-entrantly folded extension arm extending generally toward said trigger means; and said trigger means locking arm is provided with a laterally extending abutment portion to catch onto said latch means re-entrantly folded extension arm and thereby retain said latch means in its locked position when said latch means is moved to said locked position by insertion of said fitting into said slot and said trigger means is not moved inwardly of said buckle apparatus.

3. A trigger buckle apparatus as in claim 2 wherein:

said re-entrantly folded extension arm of said latch means is provided with an inclined end surface adjacent a portion thereof onto which said locking arm catches; and said trigger means and latch means are mounted to said base plate to bring said locking arm laterally extending abutment portion into abutting engagement with said inclined end surface of said latch means when said latch means is biased to its unlocked position by said biasing means and said trigger means is released by the user thereof, such abutting engagement retaining said latch means and trigger means in unlocked an a non-depressed position, respectively, until said latch means is rotated back into its locked position by engagement between the latch means locking finger and said fitting on assembly of said buckle apparatus to said fitting.

4. The apparatus of claim 1 wherein:

said biasing means includes a single coil spring with its opposite ends extended laterally and providing spring arms abutting and biasing said latch means and trigger means respectively.

5. The apparatus of claim 4 wherein:

said coil spring ends providing spring arms are of different lengths, the arm abutting said trigger means being longer than the arm abutting said latch means.

6. A quick release trigger actuated safety belt buckle apparatus for use in releasably securing lap and shoulder straps of a safety harness to a vehicle floor mounted eye fitting, said buckle apparatus comprising:

a buckle base plate including a hook means at one end thereof defining an aperture to receive said eye fitting and strap receiving means at an opposite end thereof for receiving strap ends of a safety harness;

a latch means pivotally mounted on said plate and including a locking finger for retaining said eye fitting in said aperture defined by said hook means when said latch means is in a locked position;

biasing means for constantly urging said latch means from said locked position to an unlocked position; and a trigger lever pivotally mounted on said plate to pivot about an axis generally adjacent said hook means and including rearwardly extending locking arm means for holding said latch means in said locked position against said spring bias until said trigger lever is moved inwardly of said buckle base plate.

7. A quick release trigger actuated safety belt buckle apparatus for use in releasably securing lap and shoulder straps of a safety harness to a vehicle floor mounted eye fitting, said buckle apparatus comprising:

a buckle base plate including a hook means at one end thereof defining an aperture to receive said eye fitting and strap receiving means at an opposite end thereof for receiving strap ends of a safety harness;

a latch means pivotally mounted on said plate and including a locking finger for retaining said eye fitting in said aperture defined by said hook means when said latch means is in a locked position;

biasing means for constantly urging said latch means from said locked position to an unlocked position; and a trigger lever pivotally mounted on said plate to pivot about an axis generally adjacent said hook means and including rearwardly extending locking arm means for holding said latch means in said locked position against said spring bias until said trigger lever is moved inwardly of said buckle base plate; and wherein:

said biasing means is also provided for constantly urging said trigger lever outwardly of said apparatus in a direction opposite so that said trigger lever is moved inwardly to release said latch means; and said latch means and trigger lever are provided with cooperating interfering arm portions which abut one another when said latch means and trigger lever are either in a locked or a released position to prevent relative rattle producing movement therebetween.

8. The trigger actuated safety belt buckle apparatus of claim 7 wherein:

said latch means is held in its released position by said spring bias and said trigger means is held in a rattle free depressed position relative to said buckle apparatus by engagement with said latch means.

9. In a quick acting trigger release safety belt buckle apparatus for use in releasably retaining a safety belt strap to a floor-mounted eye fitting, said trigger buckle apparatus including a base plate having a hook portion defining a fitting receiving slot, latch means pivotally mounted on the base plate for retaining a fitting received in said slot behind said hook portion when the latch means is maintained in a locked position and trigger means pivotally mounted on said base plate for releasing said latch means from said locked position when said trigger arm is moved inwardly of said buckle apparatus, the provision of:

biasing means mounted to said base plate for constantly biasing said latch means toward an unlocked position and said trigger means outwardly of said buckle apparatus.

10. In a quick acting trigger release safety belt buckle apparatus for use in releasably retaining a safety belt strap to a floor-mounted eye fiitting, said trigger buckle apparatus including a buckle base plate having a hook portion at one end thereof defining a fitting receiving slot, latch means pivotally mounted on said base plate for retaining a fitting received in said slot behind said hook portion when said latch means is maintained in a locked position, trigger means pivotally mounted on said base and biasing means mounted on said base plate for biasing said latch means toward an unlocked position, the provision of:

means for pivotally mounting said trigger means about an axis generally adjacent said hook portion slot, a trigger arm extending rearwardly of said buckle base plate from said axis, and a latch means engaging and locking arm extending rearwardly of said buckle base plate from said axis and defining an acute angle with said trigger arm, said latch means engaging and locking arm releasing said latch means from said locked position when said trigger arm is moved inwardly of said buckle apparatus.

References Cited

UNITED STATES PATENTS

| | | |
|---|---|---|
| 1,541,991 | 6/1925 | Moody et al. |
| 1,955,876 | 4/1934 | Ferguson. |
| 2,197,997 | 4/1940 | Dee. |
| 2,710,649 | 6/1955 | Griswold et al. |

DONALD A. GRIFFIN, Primary Examiner

U.S. Cl. X.R.

297—389